United States Patent
Robinson et al.

[15] 3,693,795
[45] Sept. 26, 1972

[54] METHOD AND APPARATUS FOR LOADING SLURRIES INTO VESSELS AND ELIMINATING THE SUSPENDING LIQUID

[72] Inventors: Charles W. Robinson, San Francisco; Kenneth E. Merklin, Tiburon; Francis D. Finlayson, Orinda, all of Calif.

[73] Assignee: Marcona Corporation, San Francisco, Calif.

[22] Filed: May 22, 1970

[21] Appl. No.: 39,667

[52] U.S. Cl. ............... 210/83, 210/242, 210/DIG. 21
[51] Int. Cl. ............................................. B01d 21/24
[58] Field of Search ................... 210/DIG. 21, 83, 242

[56] References Cited

UNITED STATES PATENTS 3,348,690  10/1967  Cornelissen ........... 210/523 X

Primary Examiner—John Adee
Attorney—Flehr, Hohbach, Test, Albritton & Herbert

[57] ABSTRACT

Method and apparatus for loading the holds of vessels with discrete ore or mineral solids characterized by a high settling rate in which the solids are introduced into the hold as a slurry to partially load the same. The slurry is then allowed to settle by gravity under quiescent conditions to form a settled zone of solids in the lower region of the hold above which are settling zones and an essentially clear layer of supernatant liquid. The supernatant liquid is withdrawn after which additional slurry is introduced into the hold to substantially fill the same. Again, the contents of the hold are allowed to settle to form a deeper zone of settled and settling solids with an overlying layer of supernatant liquid which is again withdrawn. Apparatus is disclosed for withdrawing the supernatant liquid and includes discharge conduit having an inlet head and flotation collar adapted to be submerged in and to float beneath the surface of the liquid so that the same can be withdrawn through the conduit either by gravity or by pumping action.

17 Claims, 4 Drawing Figures

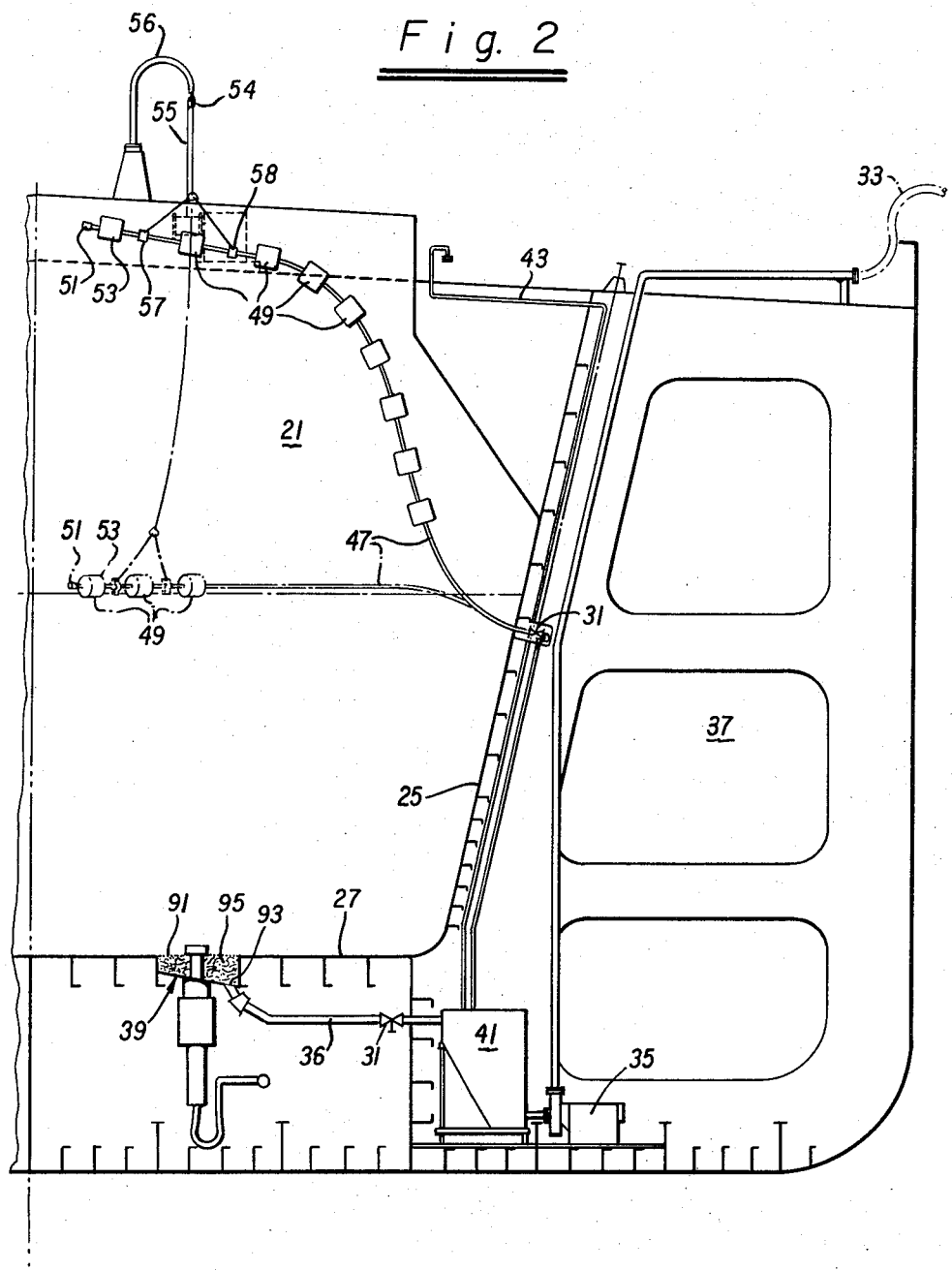

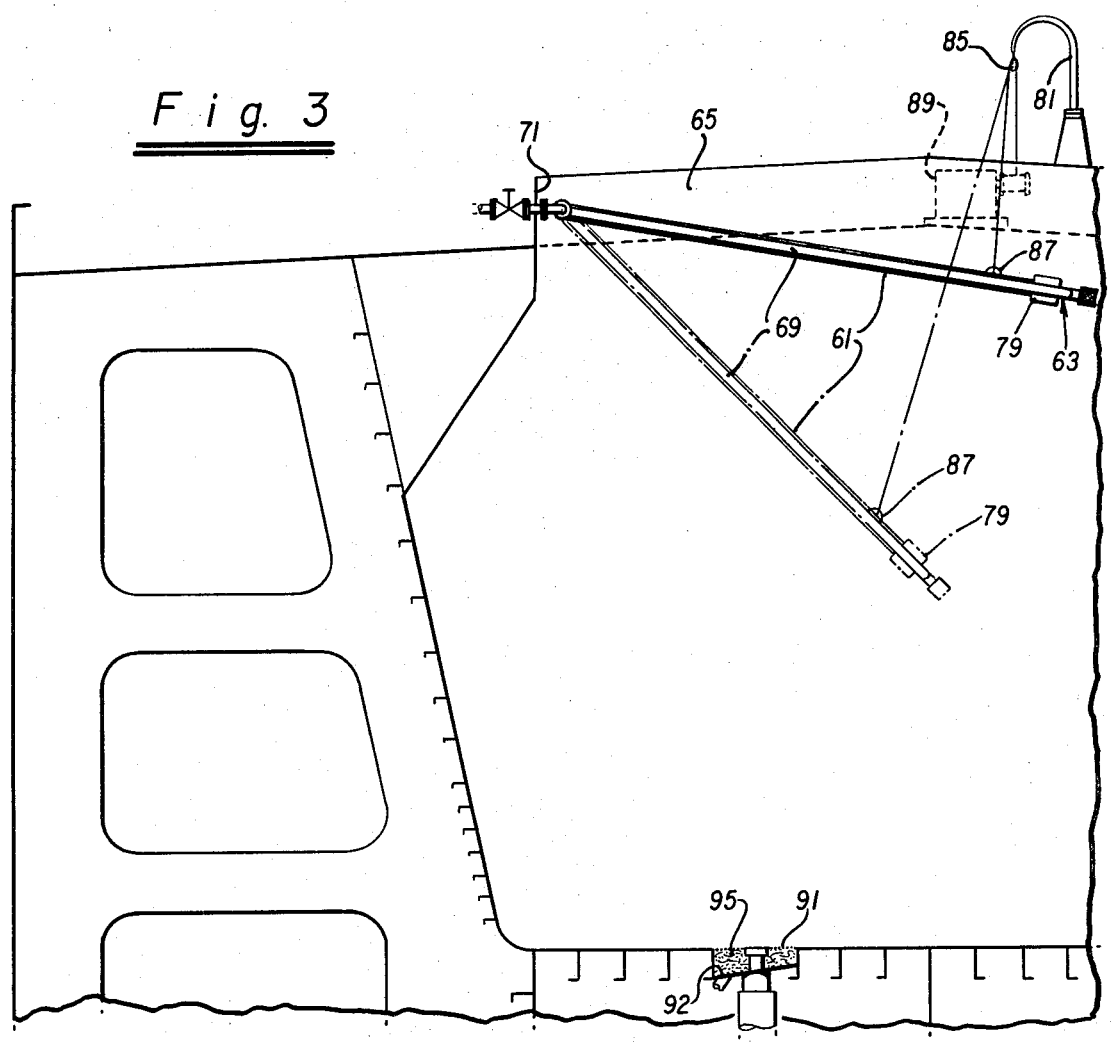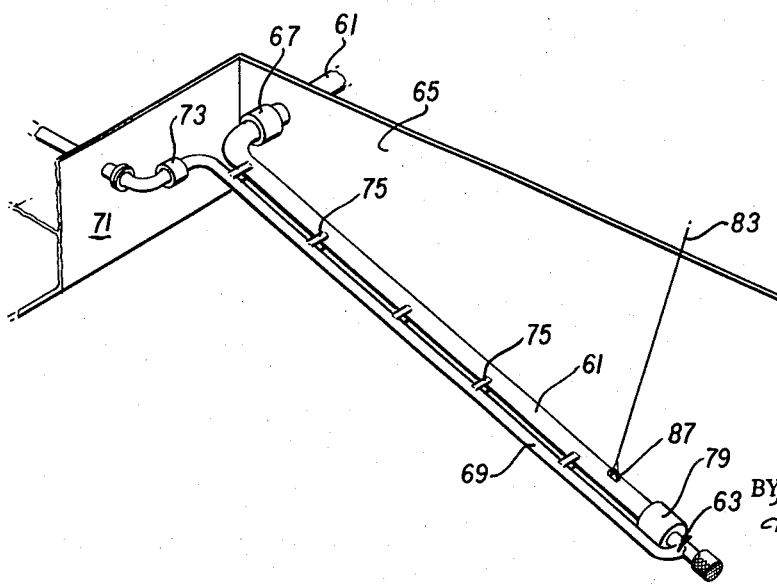

METHOD AND APPARATUS FOR LOADING SLURRIES INTO VESSELS AND ELIMINATING THE SUSPENDING LIQUID

CROSS REFERENCE TO RELATED APPLICATIONS

Reference is made to the following copending applications now issued as United States Patents, all assigned to the same assignee as the present application:
1. Method and Apparatus for Shipping Mineral Ores and Other Particulate Matter Ser. No. 778,364 filed July 31, 1968 now U.S. Pat. No. 3,606,036
2. Ore Carried with Slurry Repulping and Unloading System, Ser. No. 065,549, filed Aug. filed 17, 1970, now U.S. Pat. No. 3,606,038
3. Method and Apparatus for the Storage and Pulping of Mineral Ores and Comparable Particulate Matter, Ser. No. 863,001, filed July 10, 1969, now U.S. Pat. No. 3,606,479.

BACKGROUND OF THE INVENTION

This invention relates generally to a method and apparatus for loading pumpable slurries into a vessel such as a ship's hold in which the suspending liquid is progressively eliminated before or in the course of transporting such material from the point of loading to destination. As the liquid is removed from the freshly loaded material, its weight and volume is restored by additional pulp. Removal of the suspending liquid is essential, first, because it would otherwise reduce the total amount of material that can be transported, thus increasing the unit cost thereof; and secondly, the material must be reduced to a compacted form from a free-flowing mass to assure stability to the vessel. Thus, in summary, the disclosed method and apparatus is particularly useful where material has been loaded for transportation in a pulped or slurried form and where transportation costs and container stability are relevant factors. Other requirements are that it function rapidly to minimize the vessel's idle time, that it be technically simple to prevent mechanical breakdowns in remote geographical areas, and that it operate with a minimum loss of product in the process of removing the suspending liquid. The method and apparatus will function when the pulp loaded into the container has been allowed to rest sufficiently to permit natural (i.e., technically uninduced) settling and separation of the solid material from the liquid. This may occur in three distinct manifestations: the liquid may overlie the solid; the liquid may underlie the solid; the liquid may simultaneously overlie and underlie the solid. The method and apparatus of the present invention will accomplish the design purpose with respect to each of these distinct states.

The aforesaid applications, Ser. Nos. 827,300, 863,001, 796,730, and 778,364, disclose methods and apparatus for the loading and unloading of the ship holds with ore or mineral solids. A characteristic of such methods is that the discrete solids can be loaded in the form of a slurry which is pumped into the ship's holds and permitted to settle to form a solidified and substantially non-shifting cargo. For economical operation, the holds of the ship in such methods should be loaded with the maximum permissible tonnage of ore solids, and the bulk of the water used in pumping the ore solids aboard ship should be removed. Also, the time required for loading operations should be reduced to a minimum, and during loading the weight should be distributed to avoid improper ballasting or excessive load concentration.

The present invention is particularly applicable to the ship loading of ore or mineral solids in slurrified form, and permits the use of large cargo ships in offshore loading operations. A typical example is the loading of iron ore of the magnetic type. It is common to process such ores as by crushing, milling and beneficiating operations to produce discrete, particulate solids, the bulk of which may have a size ranging down from 100 mesh. The dry specific gravity of the particles may be of the order of 4.5, and the settling rate in water is relatively high. As disclosed in said copending applications, such ore solids can be pulped with water to form pumpable slurries which preferably contain at least 60 percent up to 80 percent solids. The present invention pertains to such methods and apparatus and is concerned particularly with the elimination or removal of water from the holds into which such slurries are introduced. It is to be understood, however, that the present method and apparatus are applicable to other vessels and to different cargos so that reference herein to the holds of vessels and ships should not be taken in a limiting sense, but rather as applicable to the interior cargo holding space of any container.

SUMMARY OF THE INVENTION AND OBJECTS

In general it is an object of the present invention to provide a method and apparatus for loading slurries into vessels and eliminating the suspending liquid which will satisfy the aforementioned requirements.

Another object of the invention is to provide an economical and convenient method and apparatus for loading discrete ore or mineral solids into the holds of ships and which will dispose of the bulk of the water content in an efficient manner without material loss of ore solids.

Another object of the invention is to provide a method and apparatus of the above character which will provide a convenient process for filling two or more holds concurrently with optimum distribution of weight over the length of the ship.

An additional object of the invention is to provide a method and apparatus of the above character which will facilitate packing of ore solids to insure a solidified and non-shifting cargo during transit.

The loading of ship's holds with slurries of discrete ore or mineral solids is characterized by high settling rates in which the solids settle to the bottom leaving a supernatant layer of clear water. In the procedure of the present invention the slurry is introduced into a hold to substantially fill the same, allowed to settle by gravity and quiescent conditions to form a settled zone in the lower portion of the hold over which lies a layer of clarified supernatant liquid. Substantially all of the liquid layer is withdrawn and the hold is again filled with additional slurry which, together with the previously introduced solids, is allowed to settle under quiescent conditions to form a deeper zone of settled solids with an overlying layer of supernatant liquid. Substantially all of this liquid is again withdrawn to leave settled solids. The above procedure is sequentially repeated until the desired load of solids is progressively developed. Certain holds are preferably being loaded while other are settling or having supernatant liquid withdrawn to thereby aid in more uniform loading and deballasting over the length of the ship.

Apparatus is provided which is particularly suitable for carrying out the above procedure and includes means for supporting the end portion of a conduit in suspended relation immediately beneath the upper surface of the supernatant liquid. In one preferred form the conduit terminates in flexible hose having means for establishing distributed floatation therealong with respect to the lightest fraction of the liquid-solid slurry system. Buoyancy means is provided for supporting the end of the hose in suspended position immediately below the upper level of the supernatant liquid.

In another form of apparatus, a rigid section of pipe is articulated and supported at the upper deck so as to permit the other end thereof to be lowered into the upper region of the hold. Buoyancy means is then provided for supporting that end of the pipe immediately below the level of supernatant liquid.

For removing the last amounts of liquid from settled slurries which permit free flow through the settled solids, discharge openings are provided in the tank top at the bottom of the hold for permitting liquid to drain out. The openings are blocked with filter means for preventing settled slurry from freely entering while nevertheless permitting liquid to flow therethrough.

These and other objects and features of the invention will become apparent from the following description and claims when taken in conjunction with the accompanying drawings.

BRIEF DESCRIPTION OF THE DRAWINGS

FIG. 2 is a cross-sectional view of a ship's hold taken transversely thereof, and illustrates apparatus having distributed buoyancy suitable for carrying out the present invention.

FIG. 3 is a cross-sectional view of a ship's hold taken transversely thereof and illustrates an alternate form of apparatus suitable for use in the present invention.

FIG. 4 is a perspective view of the apparatus of FIG. 3.

DETAILED DESCRIPTION OF THE PREFERRED EMBODIMENTS

Figure 1:
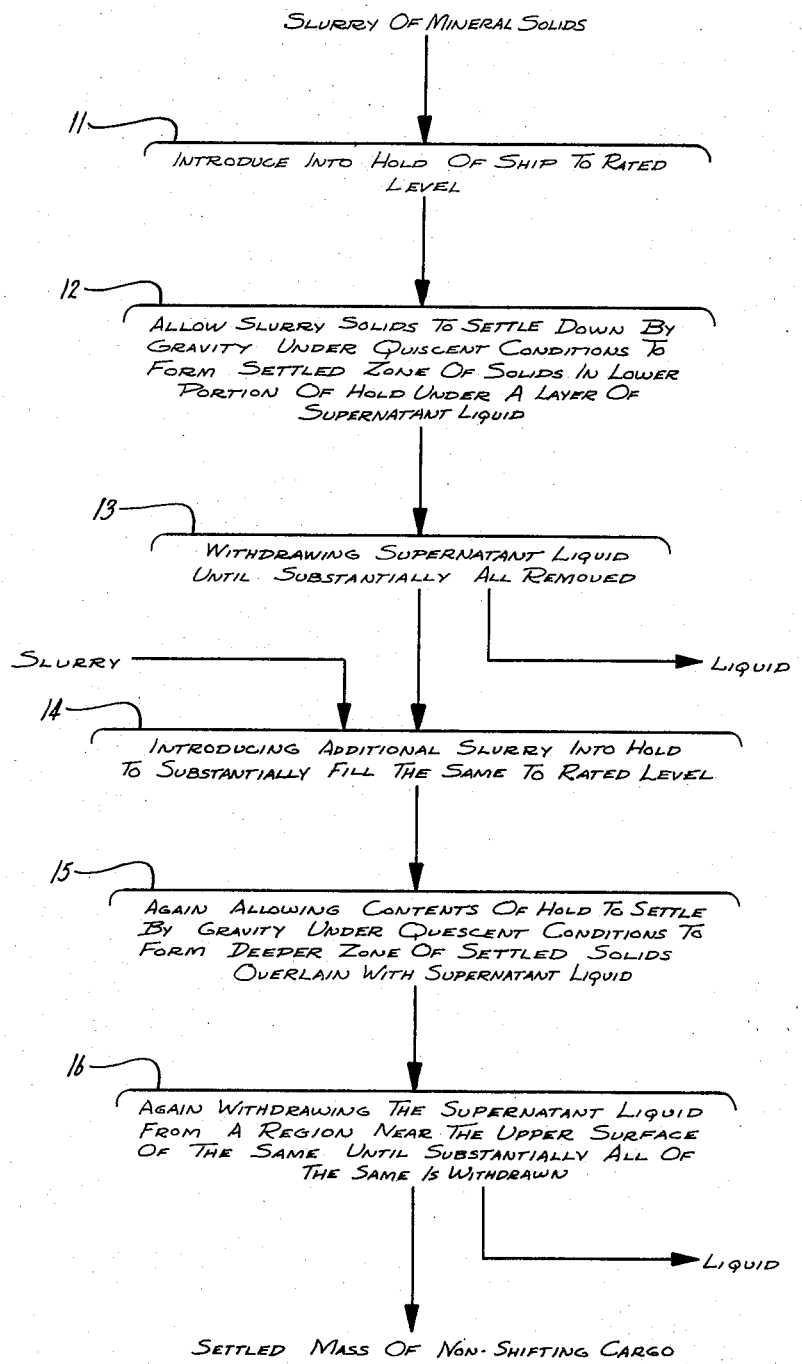
FIG. 1 is a general outline of the procedure for loading a ship with discrete solids in a settleable slurry in accordance with the present invention.

When a slurry of ore or mineral solids of the type previously described is introduced as a water slurry into the hold of a vessel and is then permitted to remain substantially quiescent, the ore solids settle rapidly toward the bottom of the hold. Actually three distinct zones are formed, the lower zone being one in which the solids have settled and are in direct physical contact; the next being a zone in which the solids are settling; and the third or upper zone being clarified, supernatant liquid from which the solids have been removed. During a settling cycle, the lower, settled zone progressively increases in depth. The upper clarified zone likewise increases in depth, while the intermediate or settling zone decreases in depth and becomes relatively shallow at or near the end of the settling cycle. When the cycle nears its end, there is a readily observable, well-defined plane of demarcation between the residual settling zone and the upper zone of clarified supernatant liquid. The present method makes use of two or more such settling cycles in loading each hold of the ship.

Furthermore, the above cycles are arranged in loading sequence for each ship since a given ship has certain debalasting capabilities and structural strength characteristics which will limit the loading operation to prevent undue stressing of the hull. Uniform loading, even at high rates, is preferable and requires lower debalasting rates. It is found preferable, therefore, to fill the ship's holds in carefully planned stages in which more than one hold is being filled at a time. With the present invention, a general procedure is provided which permits, under rapid loading conditions, slurry in a partially loaded hold to settle and be dewatered while loading operations continue in other holds. This procedure alternates or cycles between holds until a predetermined load capacity is reached.

The present invention uses the natural settling effects just described as the basis for removing the suspending liquid used in forming the slurry. As shown in FIG. 1, slurry is introduced into a hold of the ship in step 11 until the same is substantially filled to design or rated level in consideration of permissible deballasting rate and maximum safe load concentration. Often this will permit the hold to be filled nearly full due to the low density of the liquid component of the slurry and the relative amount of the same required.

In step 12, the slurry is allowed to settle in quiescent conditions by gravity to thereby form a settled zone of solids in the lower portion of the hold together with a overlying layer of supernatant liquid. Preferably the settling time is long enough that substantially all of the solids have settled and a well defined plane of demarcation has developed between the supernatant liquid and a shallow, residual settling zone immediately overlying the settled solids. Then, in step 13, the supernatant liquid is withdrawn until substantially removed leaving settled solid fraction in the hold. Additional slurry is then introduced into the hold into the volume previously occupied by supernatant liquid in step 14 and the newly added slurry mixes with the existing contents until the rated level of this stage in the procedure is reached. Again, the contents of the hold are allowed (step 15) to settle under quiescent conditions, by gravity, to form a deeper zone of settled solids resulting from those previously introduced and those present within the last added slurry. And again, in step 16, the supernatant liquid is withdrawn from a region near the upper surface thereof until substantially all withdrawn to leave a settled, essentially solid mass of settled discrete solids in the hold.

This sequence of steps is repeated if necessary until the solids content of the slurry reaches a predetermined load level. Since it is generally prohibited to leave port with excess water, the final supernatant liquid will have to be removed to comply with the International Load Line Rule. However, where otherwise possible, a ship could permit the final layers to settle while under way.

In connection with slurry solids characterized by permitting free flow of water through settled and compacted zones, it is also possible to remove nearly all additional liquid by permitting the same to drain away from beneath the compression zone of the settled slurry load under gravity to leave behind a substantially deslurried load of mineral solids.

As a practical matter, each step of removing supernatant liquid is continued to an end point defined by a change in clarity and color of the effluent being discharged. That is to say, where the clarity of the discharged liquid that is being removed is markedly reduced, the lower most regions of the clear layer have been reached and material is being withdrawn across the plane of demarcation between settling slurry and clarified, supernatant liquid.

The apparatus will now be explained in detail and the above procedure will then be viewed with reference to operation of the apparatus. Referring generally to FIGS. 2 through 5, conduits for withdrawing supernatant liquid are shown which are adapted to make use of the variable density of settled slurry to selectively withdraw such liquid. For the settling zone beneath the supernatant liquid is of greater density than the liquid and by suitable buoyancy sensing means the conduit can be made to be suspendable in the clarified liquid and above the settling solids until substantially no supernatant liquid remains so that unwanted solids removal is held to a minimum.

In the following embodiment such means takes the form of a flotation collar positioned adjacent the inlet end of a conduit which, in consideration of the weight of the conduit and density of the liquid being removed, permits the inlet end thereof to immerse into the supernatant liquid where it floats at least partially beneath the upper surface as the liquid is withdrawn.

Referring now more particularly in detail to the FIGS. 2 through 4, there is shown a cross-sectional view of a ship's hold defined by transverse bulkheads 21, longitudinal bulkheads 23 and 25, and an inner bottom 27. Slurry distribution piping, not shown, is provided and includes suitable means for selectively routing the slurry received from or delivered to suitable shore connected piping 33 to various holds. It will be understood that the ship can be anchored at a suitable off-shore pumping station and served by submerged pipelines or can be docked at conventional harbor facilities. As disclosed in copending application "Method and Apparatus for the Storage and Pulping of Mineral Ores and Comparable Particulate Matter," filed July 10, 1969, Ser. No. 863,001, a pumping facility is established in the lowermost region within the vessel and includes a slurry pump 35 which is located in a wing tank 37, but could be located in a ship's pump room or another convenient location. The slurry pump 35 is connected through discharge piping 36 to any of a plurality of sumps 39 located in the ship's bilges, each of which may be provided with reslurrying apparatus as disclosed in the referenced application. Preferably, each sump drains under gravity into a collection tank 41 incorporated in the discharge piping. A vent line 43 is provided from the collection tank 41 to the upper deck level.

Withdrawal conduit means is connected to the branch flange and comprises a length of flexible hose 47 made of a rubberized and impregnated carcass of strong belting. Flotation means are distributed along the length of the hose for providing flotation sufficient to keep its length afloat at the upper surface of the supernatant liquid layer. Such means can consist, for example, of a plurality of flotation collars 49 secured about the hose at spaced locations therealong. Alternatively, the hose could be provided with a uniformly distributed flotation jacket. Lengths of such hoses are commercially available from such sources as Hewitt-Robbins, a division of Litton Industries.

The end of the hose terminates in an inlet head 51 which may be no more than that end of the hose but preferably includes a filter screen for keeping out particulate matter. Buoyancy means is provided for supporting the inlet end of the hose and any associated equipment at a predetermined level within the liquid fraction of settling slurry. Such means preferably takes the form of a flotation collar 53 or jacket which has sufficient buoyancy to maintain the hose inlet end at a level within the supernatant liquid layer, that is to say, between the upper surface of the supernatant liquid and the settling zone beneath it so that the essentially clear water is drawn off without taking significant quantities of solids.

The hose construction just described is further supported by a block 54 and tackle 55 swung from a davit 56 at upper deck level and attached to padeyes 57, 58 on the end of the hose so that the hose can be lifted clear of the material in the hold during slurry filling operations. The other end of hose 47 is connected to an inlet of tank 41 through a valve 59. After the slurry has been introduced, the hose is lowered and tends to remain on the upper surface of settling slurry due to the flotation and buoyancy provided. After a predetermined settling period the hose line is opened by valving 59 and the upper layer of liquid drained off under gravity through the collection tank 41.

After the first cycle of filling and withdrawing supernatant liquid, the davit block and tackle are again used to hoist the hose upwardly clear of the material in the hold and the second cycle is commenced and carried out as previously described. After each filling of the hold, the hose is again lowered into the slurry where it floats until the next scheduled withdrawal of liquid.

FIGS. 3 and 4 illustrate another form of the invention in which a rigid discharge pipe 61 is operated completely from upper deck level, use being made of an eductor jet pump 63 to create the necessary pumping action to remove the supernatant liquid. The discharge pipe is of large diameter (12 inches) and is connected at one end through the sidewall of the hatch coaming 65 by a swivel union 67. A smaller diameter (8 inches) high pressure water pipe 69 is also connected through hatch coaming 71 by a second swivel union 73 and extends along side discharge pipe 61 being supported on the same with suitable bracing 75. The high pressure pipe 69 is connected to the eductor jet pump high pressure inlet 77. The eductor is a jet pump in which high pressure water is injected into the stream of supernatant liquid within a venturi and causes a pressure drip so that a pumping force is created. Other suitable types of pumps can be substituted for an eductor pump as desired.

The inlet end or head of the discharge line is provided with a floatation collar 79 which provides sufficient buoyancy to suspend the inlet end of the pump in the supernatant liquid above settling slurry but nevertheless allows it to fully immerse adjacent the surface of the supernatant liquid layer.

In order to manipulate the level of the pipe independently of the level of the material within the hold, a hoisting davit 81 is provided on the upper deck and a line 83 is reeved over a block 85 on the davit to a padeye 87 near the free end of the discharge pipe. The other end of the line is taken to a suitable winch 89 operation which controls the level of the discharge pipe when the same is clear of the contents of the hold. The operation of the apparatus just described is similar to that described for the apparatus of FIGS. 2 through 4 except for the pumping action required during liquid withdrawal.

In the operation of this apparatus with usual high grade ore concentrates, the slurry is allowed to settle until there is developed a well-defined plane of demarcation between a settling zone and a supernatant liquid layer of the suspending liquid. The hose or discharge pipe is then lowered into contact with the upper surface of the supernatant liquid so that the inlet head or end of the discharge hose or pipe is immersed. The supernatant liquid is then commenced to be withdrawn or decanted either by the action of the jet pump or under the influence of gravity and is continued to be withdrawn until substantially all of the supernatant liquid is removed. Generally the termination of this step is marked by a noticeable reduction in the clarity of the liquid being removed. At this point material from the settling zone is being removed and the decanting operation should be stopped.

The decant conduit is then again withdrawn clear of the material remaining in the hold and additional slurry is introduced into the hold into the volume previously occupied by the withdrawn supernatant liquid. Thereafter both the newly added slurry and the remaining fraction of the previously introduced settling slurry is permitted to further settle and form a second, well-defined plane of demarcation between settling zone and a second layer of supernatant liquid. The decant piping is then reimmersed and the withdrawal of the second supernatant liquid layer is commenced adjacent its upper surface. Withdrawal of the second layer is continued until substantially all of it is removed. The foregoing steps are repeated until the solids content of the remaining slurry fraction at some step reaches the predetermined load level called for the particular material and the design capacity of that hold of the ship.

Effluent water from settled slurry is essentially clear water and may be dumped over the side if desired. There will, however, be some likelihood that some solids will be lost and, especially in a fresh water system, it will be desirable to recover this water. Accordingly the effluent water is preferably returned through line 33 back to shore where it and any contained solids can be reused to form more slurry or for other purposes.

By way of example the following sequence illustrates the use of the present invention in a practical loading of the ship S. J. Merchant. Each hold was loaded in accordance with the following cycle.

| | |
|---|---|
| Initial loading with slurry 75% solids depth—42 ft. | 2 hours |
| Settling time | 6 hours |
| Dewater | 2 hours |
| Second loading with slurry | 7 hours |
| Settling time | 12 hours |
| Second dewater | 1 hour |
| Third loading | ¼ hour |
| solids 90% final dewater at sea to 93–95% solids | |

The holds were loaded in sequence so that settling and decanting of certain holds proceeded at the same time as loading of others. After removal of supernatant water above the settled slurry, the remaining water can be removed by permitting it to drain off through filters and packing installed in sumps formed on the inner bottom. Such drainage can take place during the voyage of the ship so that valuable time is not lost. Filters 91, 92 serve to cover the opening in the sump to prevent settled slurry from freely entering while permitting liquid to flow through. Such filters can take various forms such including a screen 91 supported on a grate (not shown) covering the sump opening and a second screen 92 and grate (not shown) covering the discharge line opening. Filter packing 95 is preferably disposed between the grates and throughout the volume of the sump and can be made of stranded fiber glass felting.

Such additional liquid withdrawal by drainage is particularly applicable to materials which when settled and compacted nevertheless permit relatively free flow of liquid. Some high mineral content sands fall into this catagory, such as New Zealand black sand. When completely drained in this manner, the settled, dewatered contents have approximately 3 to 5 percent moisture which is comparable to that of dryloaded cargoes of similar material.

The present invention is particularly applicable to the ship loading of discrete iron ore solids or concentrates in slurrified form and permits the use of large cargo ships in off-shore loading operations. It thereby eliminates the large capital investments required for building harbor and docking facilities suitable for dry loading such iron ore slurries which can be loaded aboard ship by pumping directly from shore storage ponds. Where the vessel is close aboard the slurry can be as dense as 75 to 80 percent solids, the actual density limitation being set by the density at which the slurry can be pumped or reclaimed from the storage pond. For loading at greater distances where the vessel is moored several miles off shore, the optimum density may be as low as 60 to 70 percent iron ore solids and considerable water will have to be removed. In either situation the present invention provides a convenient, reliable and general method for loading discrete particulate minerals aboard ship as a slurry and for removing the excess water after the slurry has been pumped aboard and settled.

While the present invention as disclosed herein was developed for application to iron ore concentrates in slurried form, it is to be understood that many other minerals may be handled utilizing the same procedures and apparatus. And, mention has been of its applicability to certain iron containing sands from areas in New Zealand as suited for being handled by the method and apparatus of the present invention.

High grade iron ore slurries such as those using magnetic type concentrates are found to settle rapidly and to a high density and a load of dewatered iron concentrates of this type result in a mass which is relatively non-free flowing and which posses a sufficiently solid-like characteristics that the necessity of the safety precautions required in tanker practice are unnecessary, so that a conventional hull structure with low compartmentation requirements can be used in the transportation of materials originally loaded and ultimately unloaded in slurry form, but economically transported by surface ship as an essentially non-shifting, dewatered mass.

Many modifications and adaptations of the present invention will occur to those skilled in the art to which it relates. For example, as an alternative, slurry may be loaded into certain loading holds with overflow from these passing over weirs provided between holds under gravity into adjacent holds. This will accelerate the settlement and compaction in those holds loaded first, and final overflow can be arranged into one or more small holds specially equipped for treatment of the lighter material which has overflown from the initially loaded holds. Furthermore, special treatment can be employed to accelerate settlement as, for example, by the addition of chemical flocculents, the use of magnetic flocculators, sonic vibrations, and use of special decanting arrangements, by gravity, or through the slurry collection tank to be discharged overboard by the slurry pump. In this way, more refined techniques may be applied to a smaller volume of material to accelerate the process of obtaining pulp density goal of a minimum 90 percent before vessel departure in the shortest amount of time.

We claim:

1. A method for loading the holds of a ship with discrete ore solids having a relatively high settling rate, comprising introducing a slurry of the solids into a hold of the ship to substantially fill the same, allowing solids of the slurry to settle by gravity under quiescent conditions to form a settled zone of solids in the lower portion of the hold together with a layer of supernatant liquid overlying the settled solids, withdrawing of the supernatant liquid from a region adjacent the upper surface of the same until substantially all of the supernatant liquid is removed, introducing additional slurry into the hold to again substantially fill the same, again allowing the contents of the hold to settle under substantially quiescent conditions to form a deeper zone of settled solids with an overlying layer of supernatant liquid and then again withdrawing supernatant liquid from a region near the upper surface of the same until substantially all of the supernatant liquid is withdrawn whereby a settled mass of solids is developed within said hold.

2. A method as in claim 1 in which withdrawal of supernatant liquid is commenced in each instance when substantially all of the solids have settled and when there is a well defined plane of demarcation between the supernatant liquid and a residual settling zone immediately overlying the settled solids.

3. A method as in claim 1 in which slurry is being introduced into a second hold while supernatant liquid is being withdrawn from the first hold into which the slurry is introduced.

4. A method as in claim 1 further including the steps of repeating the foregoing steps until the solids content of the remaining slurry fraction reaches a predetermined load level.

5. A method as in claim 4 further including the step of continuing to remove supernatant liquid after the load level has been obtained.

6. A method as in claim 1 further including the step of withdrawing additional liquid by permitting the liquid from beneath a lowermost compression zone of said load to drain away under gravity whereby a substantially deslurried load of mineral solids is obtained.

7. A method as in claim 1 in which each step of withdrawing supernatant liquid is terminated when the clarity of the liquid removed is markedly reduced.

8. In apparatus for loading ships with settleable slurry, means for removing suspending liquid from slurry aboard said ship, said ship having at least one hold for the reception of slurry wherein said slurry is allowed to settle under gravity into layers including a substantially clear layer of supernatant liquid overlying settling layers, and in which said hold includes a tank top, a conduit having an inlet end for picking up liquid, means for supporting the end portion of said conduit in suspended relation immersed beneath the upper surface of supernatant liquid, discharge sumps formed in the tank top at the bottom of the hold for permitting withdrawal of liquid therefrom, filter means disposed in and covering said sumps to prevent settled slurry from freely entering while permitting liquid to flow there through, discharge piping connected to said discharge sumps, valve means for selectively opening and closing said discharge piping.

9. Apparatus as in claim 8 wherein said filter means including a packing of stranded fiberglass felting disposed in said sumps to serve as a filtering media therein.

10. In apparatus for loading ships with settleable slurry, means for removing suspending liquid from slurry aboard said ship, said ship having at least one hold therein for the reception of slurry, said hold including a tank top at the bottom thereof, said slurry being allowed to settle under gravity into layers including a substantially clear layer of supernatant liquid overlying denser settling layers, discharge sumps formed in the tank top at the bottom of the hold for permitting withdrawal of liquid, filter means disposed in and covering said sumps to prevent settled slurry from freely entering while permitting liquid to flow therethrough, discharge piping connected to said discharge sumps, valve means for selectively opening and closing said discharge piping.

11. Apparatus as in claim 10 in which said means for removing suspending liquid includes conduit means having an inlet end for withdrawing supernatant liquid from a region adjacent the upper surface of the same and means for supporting the inlet end of said conduit means in suspended relation immediately beneath an upper surface of said supernatant liquid and for adjusting and lowering the level of said conduit inlet end with respect to said hold.

12. Apparatus as in claim 11 wherein said supporting means for said inlet end includes means for establishing distributed flotation therealong with respect to the lightest fraction of the slurry system employed whereby said conduit is supported immediately beneath the upper surface of the layer of supernatant liquid.

13. Apparatus as in claim 10 where said conduit comprises a section of pipe, and further including swivel union means for supporting one end of said pipe near the upper region of said hold for permitting movement of the inlet end to varying levels in said hold.

14. In apparatus for loading a vessel with settleable slurry, means for removing suspending liquid from slurry, said vessel having at least one hold for the reception of slurry wherein said slurry is allowed to settle under gravity into layers including a substantially clear layer of supernatant liquid overlying settling layers, and in which said hold includes a bottom wall, a conduit having an inlet end for picking up liquid, means for supporting the end portion of said conduit in suspended relation immersed beneath the upper surface of supernatant liquid, at least one discharge sump formed in said bottom wall for permitting withdrawal of liquid therefrom, filter means disposed in and covering said sumps to prevent settled slurry from freely entering while permitting liquid to flow therethrough, discharge piping connected to each of said discharge sumps, valve means for selectively opening and closing said discharge piping.

15. In apparatus for loading a vessel with settleable slurry, means for removing suspending liquid from said slurry, said vessel having at least one hold therein for the reception of slurry, said hold including bottom, said slurry being allowed to settle under gravity into layers including a substantially clear layer of supernatant liquid overlying denser settling layers, at least one discharge sump formed in said bottom for permitting withdrawal of liquid, filter means disposed in and covering each sump to prevent settled slurry from freely entering while permitting liquid to flow therethrough, discharge piping connected to each discharge sump, valve means for selectively opening and closing said discharge piping.

16. A method for loading a vessel with discrete ore solids having a relatively high settling rate, comprising introducing a slurry of the solids into said vessel to substantially fill the same, allowing solids of the slurry to settle by gravity under quiescent conditions to form a settled zone of solids in the lower portion of the vessel together with a layer of supernatant liquid overlying the settled solids, withdrawing of the supernatant liquid from a region adjacent the upper surface of the same until substantially all of the supernatant liquid is removed, introducing additional slurry into the vessel to again substantially fill the same, again allowing the contents of the vessel to settle under substantially quiescent conditions to form a deeper zone of settled solids withdrawing supernatant liquid from a region near the upper surface of the same until substantially all of the supernatant liquid is withdrawn whereby a settled mass of solids is developed within said vessel.

17. A method for loading a vessel with discrete solids having a relatively high settling rate, comprising introducing a slurry of the solids into said vessel to substantially fill the same, allowing solids of the slurry to settle by gravity under quiescent conditions to form a settled zone of solids in the lower portion of the vessel together with a layer of supernatant liquid overlying the settled solids, withdrawing of the supernatant liquid from a region adjacent the upper surface of the same until substantially all of the supernatant liquid is removed, introducing additional slurry into the vessel to again substantially fill the same, again allowing the contents of the vessel to settle under substantially quiescent conditions to form a deeper zone of settled solids with an overlying layer of supernatant liquid, then again withdrawing supernatant liquid from a region near the upper surface of the same until substantially all of the supernatant liquid is withdrawn whereby a settled mass of solids is developed within said vessel, and withdrawing additional liquid by permitting the liquid from beneath a lowermost compression zone of said load to drain away under gravity whereby substantially deslurried load of solids is obtained.

* * * * *